(12) United States Patent
Gheorghe et al.

(10) Patent No.: US 7,533,682 B2
(45) Date of Patent: May 19, 2009

(54) SYSTEM AND METHOD OF PROVIDING WATER FLOW RATE COMPENSATION

(75) Inventors: Bogdan Gheorghe, Oak Park, IL (US); Philip C. Hawken, Darien, IL (US)

(73) Assignee: Robertshaw Controls Company, Carol Stream, IL (US)

( * ) Notice: Subject to any disclaimer, the term of this patent is extended or adjusted under 35 U.S.C. 154(b) by 532 days.

(21) Appl. No.: 11/059,901

(22) Filed: Feb. 17, 2005

(65) Prior Publication Data

US 2006/0180206 A1    Aug. 17, 2006

(51) Int. Cl.
*G05D 7/06* (2006.01)
(52) U.S. Cl. .............................. 137/2; 137/486; 73/1.34; 73/1.36; 702/46; 702/100; 700/282
(58) Field of Classification Search ...................... 137/2, 137/486, 487.5, 624.11, 624.2; 222/14, 20; 73/1.27, 1.34, 1.36; 702/86, 100, 46; 700/282; 377/21
See application file for complete search history.

(56) References Cited

U.S. PATENT DOCUMENTS

| | | | | |
|---|---|---|---|---|
| 4,581,946 A | * | 4/1986 | Kanayama | ............... 73/861.77 |
| 4,885,943 A | * | 12/1989 | Tootell et al. | ............ 73/861.77 |
| 5,016,187 A | * | 5/1991 | Forkert et al. | .................. 702/46 |
| 5,124,934 A | * | 6/1992 | Kawamoto et al. | .......... 700/282 |
| 5,321,992 A | * | 6/1994 | Mudd et al. | .............. 73/861.77 |
| 5,429,272 A | | 7/1995 | Luigi | |
| 5,574,229 A | * | 11/1996 | Castillo | .................... 73/861.78 |
| 6,092,374 A | * | 7/2000 | Kang et al. | ..................... 62/74 |
| 6,092,410 A | * | 7/2000 | Kaehler et al. | ............... 73/1.34 |
| 6,721,669 B2 | * | 4/2004 | Kopl et al. | ..................... 702/55 |
| 6,912,870 B2 | | 7/2005 | Gnadinger | |

* cited by examiner

*Primary Examiner*—Kevin L Lee
(74) *Attorney, Agent, or Firm*—Reinhart Boerner Van Deuren P.C.

(57) ABSTRACT

A system and method of flow rate compensation is provided to allow precise volume dispensing over widely varied and varying input process media pressure and flow conditions. This system utilizes empirical data of actual flow rate versus flow rate measured by a flow meter to characterize flow meter non-linearities. This data is used to generate a compensation control curve. The system controller receives flow data from a flow meter in the field and calculates pulse duration of the output of the flow meter. The compensation control curve is then used to determine the volume of process media flowing at any given time. This instantaneous volume information is added to an accumulator to determine the volume of process media dispensed. This volume is compared to a target volume. Once this target volume is reached, the flow of process media is stopped.

16 Claims, 3 Drawing Sheets

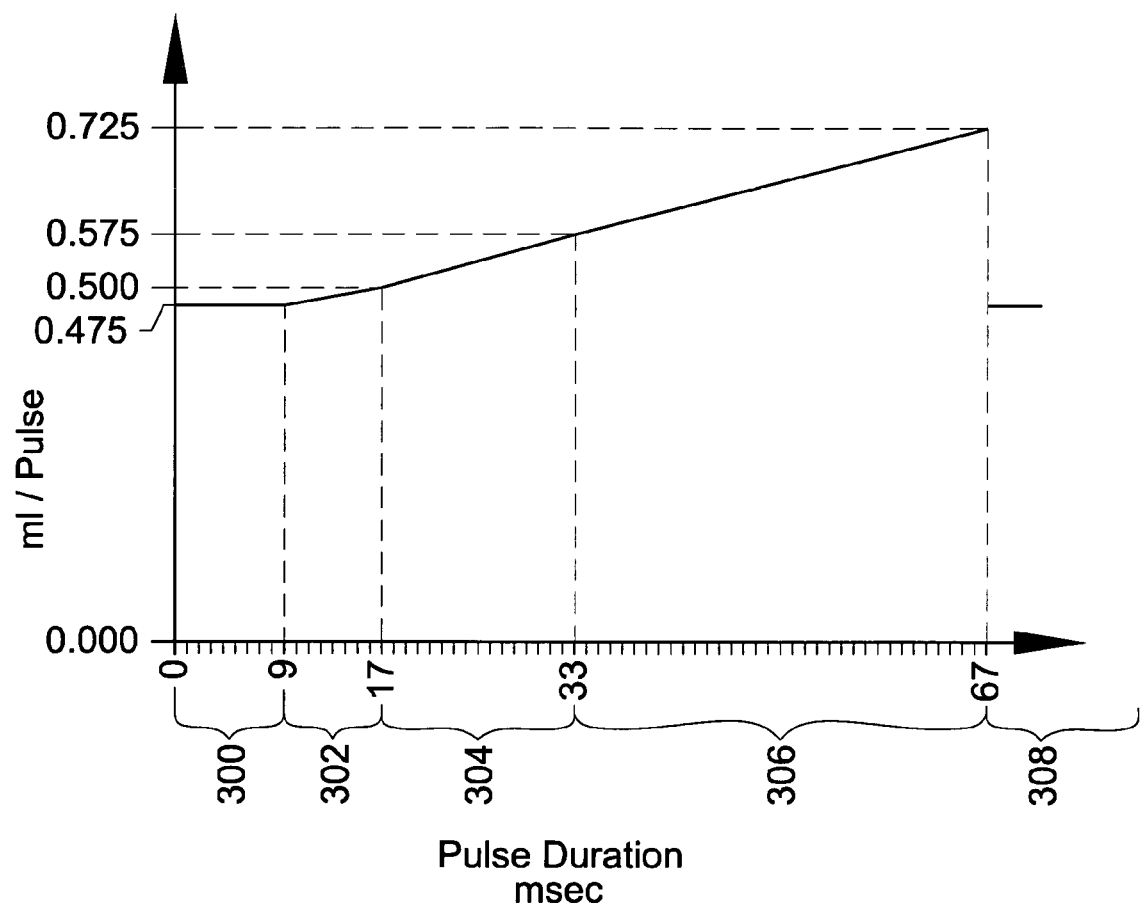

SYSTEM AND METHOD OF PROVIDING WATER FLOW RATE COMPENSATION

FIELD OF THE INVENTION

The present invention relates generally to systems and methods for regulating flow rate and dispensed volume of a media, and more particularly to a system and method of compensating a monitored flow rate of a flow meter to ensure precise volume dispensing.

BACKGROUND OF THE INVENTION

There are many applications that require precise flow control to ensure that a proper volume of liquid, gas, etc. is dispensed. Such applications include, for example, manufacturing, consumer products, medical systems, pharmaceuticals, etc. These various. applications require some type of process control that takes into account the flow rate of the process fluid or media and the amount of time that such fluid or media is flowing to dispense the proper volume. While many such applications control all aspects of the entire system, e.g., input pressure, fluid temperature, etc., other systems that have this same requirement are not so fortunate.

One such industry which requires volume control of the dispensed process fluid, but does not have the luxury of controlling all of the parameters that would affect such fluid flow, is the consumer appliance industry. For example, an automatic ice maker in the freezer compartment of a refrigerator includes a water control valve that is used to control the flow of water into the ice cube molds. As will be readily apparent, it is important that the flow of water into the ice cube molds does not continue for a period that would result in water overflowing the molds into the main freezer compartment. Likewise, the flow of water into the molds needs to continue for a period sufficient to fill these ice cube molds so that cubes of sufficient size are produced.

While typical process fluid control systems utilize a known, fixed input pressure and flow rate, the fact that consumer appliances are installed across the entire country in various municipalities and rural areas, no such controlled input pressure can be assured. That is, the input water pressure at one installation site in a particular town may be vastly different than the input water pressure in some other installation. Indeed, the input pressure may not even be maintained at a stable level during different periods of the day at a given location based on other activities that use the same water supply, for example, watering of the lawn, hydrant flushing, etc. Nonetheless, consumer appliances installed at all of these various locations are still expected to operate properly, i.e., fill the ice cube tray properly in this example.

One prior mechanism utilized in such systems employs a rubber flow washer that reacts to the varying input pressure conditions. The flow washers contain either a center orifice and/or bypass flow paths, both of which close down as the pressure acting on them increases. This is meant to control the flow through the flow washer to a known maximum level despite an increase in input pressure that would otherwise increase the flow rate. This flow washer acts to maintain the same delivered volume over time by restricting the orifice to clip or limit the flow rate increase that would otherwise occur. Depending on the flow washer, the typical flow curve rises somewhat linearly from 0 psi to about 20 psi and then flattens out to give a somewhat equal dispense over the remaining pressure range, typically to 120 psi. As such, normal operation would occur between about 20 psi to 120 psi, and a less than acceptable dispense would occur from about 20 psi and lower. Based on this maximum flow rate, the appliance controller simply opens the valve to the ice maker for a fixed period of time to fill the ice cube molds.

Unfortunately, the use of a flow washer does not provide acceptable results at lower input pressure conditions where the pressure is too small to affect any orifice size change on the flow washer. That is, while a flow washer can restrict or limit the maximum flow rate therethrough, it cannot maintain such a flow rate at low input pressure conditions. As a result, the timed operation of the valve used to fill the ice cube tray in this example may not provide an adequate volume of water at lower pressure installation locations. Consumers who have low water pressure, therefore, may become upset with the small size of the ice cubes, and may even incur the expense of a service call thinking that a malfunction has occurred in their ice maker. As is clear, then, such a flow washer is primarily a safeguard against an overfill condition, but may allow an underfill condition when the input pressure of the water line is low.

An alternate solution that has been employed in the appliance industry and elsewhere is the use of a flow meter in conjunction with the water valve to monitor the actual flow of water therethrough. A typical flow meter outputs a square wave pulse signal whose frequency is related to the flow rate of the media stream in which it is positioned. The use of such a flow meter should provide an accurate indication of the actual flow passing through the flow control valve and into the ice cube molds. Unfortunately, there is a change in the response of such flow meters based on the flow rate of the media itself. That is, at a given flow rate the flow meter will produce a certain amount of pulses per unit time. At a higher flow rate through the valve, the flow meter will give a different value of pulses per unit time. However, this change in frequency of the flow meter output is not linearly related to the change in flow rate itself. If it were, a controller would simply need to read the frequency of pulses to calculate the flow rate of the media, and then use this information to control the length of time that the valve is opened to dispense a given volume of fluid.

The non-linearity of the output of a flow meter is well documented and may be easily compensated by performing field calibration testing and adjusting the control parameters of the controller. However, such a requirement of individual field calibration of the flow meter in a mass produced consumer appliance is unworkable. Recognizing this, many consumer appliance manufacturers design their controls to prevent an overflow condition in high water pressure installation locations. They then simply have to accept the fact that underfill conditions may result because of the change in response of the flow meter at the varying flow rates caused by the differing input pressures at different locations and at different times throughout the day.

There exists, therefore, a need in the art for a process fluid control system that ensures a known volume of process fluid will be dispensed at each operation regardless of input pressure conditions at different locations and at different times throughout the day.

BRIEF SUMMARY OF THE INVENTION

In view of the above, it is an object of the present invention to provide a new and improved process flow control system and method that overcomes the above and other problems currently existing in the art. More particularly, it is an object of the present invention to provide a new and improved process fluid control system and method that reliably provides a known volume of process fluid over various and/or varying input pressure conditions.

In one embodiment to the present invention, the system utilizes a flow meter to monitor the flow of process fluid through a valve. The output of the flow meter is read by a controller which compensates for the non-linearity of the flow meter output to provide a reliable indication of actual flow through the valve. The controller then controls the operation of the valve to ensure a known volume of fluid is dispensed therethrough. A further embodiment of the present invention also utilizes a flow washer that operates to limit the maximum flow rate through the valve.

In an embodiment of the present invention, when a demand for flow is started, pulse data is received from a flow-measuring device placed in the stream of the media. The pulse profile is measured by applying a time base to the data. The high and low duration of the pulse may be measured to compare or manipulate as needed. The pulse duration is matched to a data curve that reflects the non-linearity of the flow measuring device to predict the volume of media flowing under such pulse duration conditions. This volume information is then added to a running counter to total the flow. This running total is compared to the target volume for the dispense cycle. When this target volume is reached, the demand for flow is stopped.

In a further embodiment of the present invention, the system includes a valve with an integrated flow meter positioned therein. An electronic controller may also be integrated with or provided separately from the water valve to control the water valve to ensure a proper volume is dispensed despite varying or various input pressure conditions. The controller may utilize a data curve that is continuous, piece wise linear, or discontinuous to compensate for the non-linearity. Additionally, the controller can calculate the control surface from an embedded algorithm or may utilize a look up table for the compensation of the output of the flow meter.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings:

FIG. 3 is a volume control curve utilized by one embodiment of the present invention to compensate for the non-linearities of the flow meter over the input pressure range.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

While the system and method of the present invention may find wide applicability to systems that need to provide a regulated volume of processed fluid despite varying or various input pressure conditions, the following description will utilize one exemplary implementation of an ice maker in a consumer refrigerator in the description that follows. However, such an exemplary implementation should not be taken as limiting the scope of the invention to any particular implementation. Indeed, while the exemplary process media in the following description is a liquid, the system of the present invention also finds application in processing of gaseous media as well. Therefore, the applicants reserve the full scope of the invention as defined in the claims appended hereto.

Figure 1:
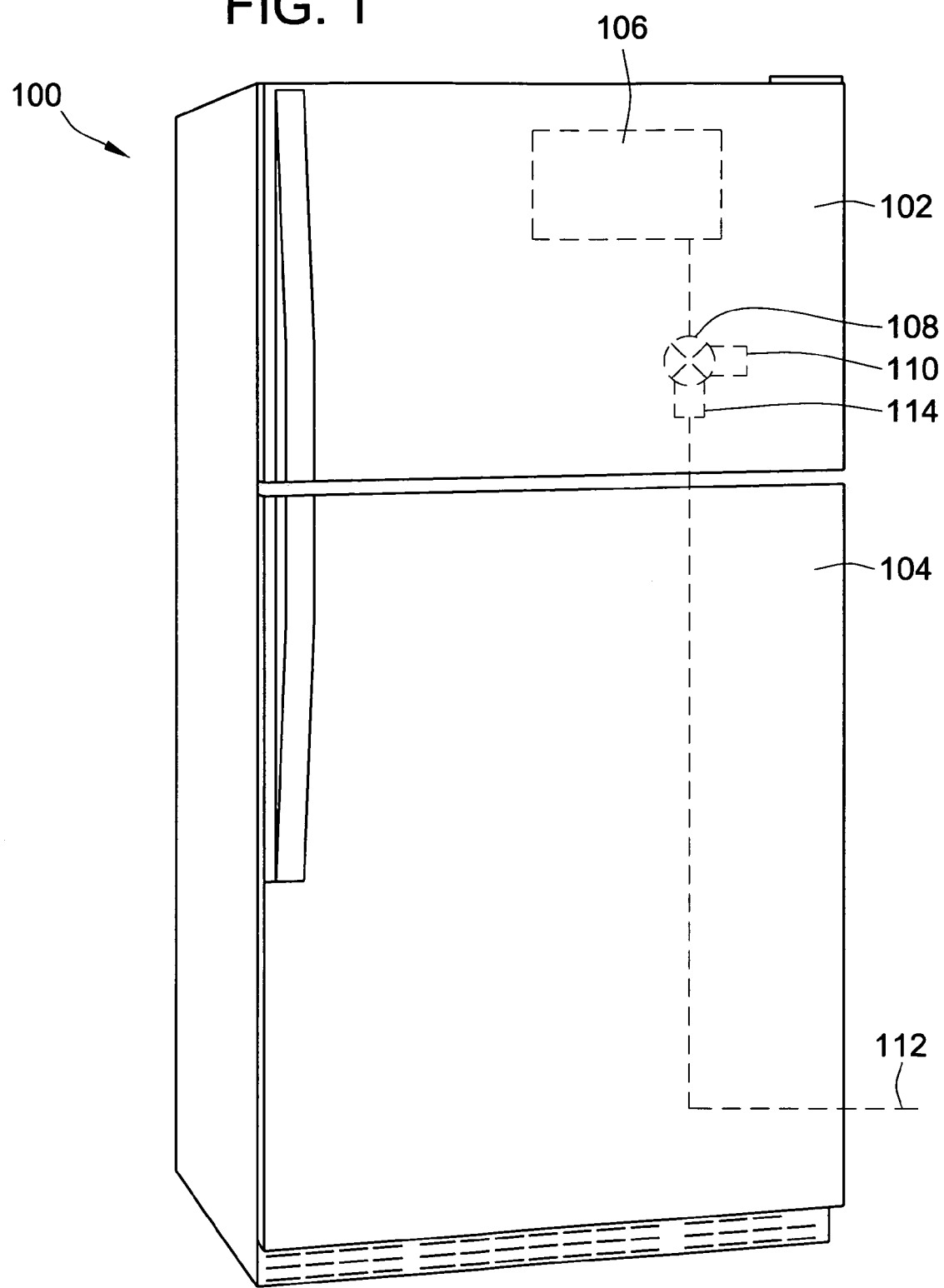
FIG. 1 is an isometric illustration of a consumer refrigerator incorporating an embodiment of a flow control system constructed in accordance with the teachings of the present invention.

Turning now to the figures, FIG. 1 illustrates this exemplary implementation of the system and method of the present invention installed in a consumer refrigerator 100. As may be seen, the refrigerator 100 includes both a freezer compartment 102 and a fresh food compartment 104. Within the freezer compartment 102 of refrigerator 100, an ice maker 106 is included to automatically make ice for the consumer's convenience. Operation of the ice maker itself is conventional and therefore will not be described in detail herein. However, some brief description may be beneficial. In general the ice maker operates by dispensing a volume of water into ice cube molds to fill these molds to a given level. Once the ice cube molds have been filled with water, sufficient time is provided to allow the water within the molds to freeze. At this point the ice cubes are removed from the molds and are placed into an ice storage chamber for use by the consumer. After the ice cubes have been removed from the molds, the system operates to again fill the molds with water.

In the system of the present invention, the control and regulation of the automatic filling operation is accomplished by the valve 108 and controller 110 of the present invention. The valve 108 receives water from the home plumbing system via an input water line 112. As discussed above, the input water pressure in line 112 is dependent on the water pressure of the plumbing system of the particular residence or location where the refrigerator 100 is installed. This input water pressure may vary significantly from location to location, and also vary significantly during different periods of the day. Therefore, the valve 108 and controller 110 of the present invention must operate to dispense a known target volume of water into the ice cube molds irrespective of the input water pressure in line 112 to allow the ice maker 106 to operate properly. That is, the valve 108 and controller 110 operates over the entire range of input water pressure in line 112 to ensure that the ice cube molds are filled properly, i.e., not under filled or over-filled, even if the water pressure varies during the filling process or changes from one filling process to the next.

In one embodiment of the present invention, the system utilizes flow meter 114 to measure the flow rate of the water in line 112 when the controller 110 has commanded the valve 108 to open to dispense water to the ice maker 106. Preferably, this flow meter 114 is integrated with valve 108. As discussed above, even if the input water pressure in line 112 were to remain steady during this dispense period, the non-linearity of the flow meter 114 may result in an inaccurate indication of the actual flow that would be induced by the particular water pressure in line 112 at the location of installation of the refrigerator 100. As such, the controller 110 must compensate for this non-linearity to ensure that the proper volume of liquid is dispensed to the ice maker 106 to prevent underfill and overfill conditions.

Further, the controller 110 must also compensate for changing conditions during the dispensed window. That is, the inlet pressure in line 112 may fluctuate during this dispense window causing a different flow or volume per time rate. While the flow meter 114 will provide an indication of the change in flow rate, due to the non-linearity of the output of flow meter 114, the change in its output may not be truly indicative of the actual change in the volume of liquid being dispensed during the time period. Therefore, the controller 110 must also compensate for these changing conditions during the dispensed window to ensure proper operation. By providing such compensation, the system of the present invention can extend the range of equal flow rate down into the lowest of pressure conditions, even with input water pressure as low as 2 or 3 psi.

In order to allow the controller 110 to compensate for the non-linearity of the flow meter 114 over the varying input pressure conditions, the non-linearity must first be understood. To gain this understanding the valves 108 and flow meters 114 were tested to generate a milliliter per pulse versus pulses per second curve, such as that illustrated in FIG. 2. In this graph the horizontal axis illustrates the number of pulses generated by the flow meter 114 per second as the flow rate is increased over the likely input water pressure conditions that may be seen. The volume of liquid dispensed per output pulse of the flow meter was measured over this input range and plotted to determine the graph of FIG. 2. This graph then provides information as to how this particular style of valve 108 acts in a particular environment. This environment may include different input pressures or changing input pressures during the dispense window. By utilizing this information the controller 110 can compensate for the non-linearities of the flow meter 114 by equating pulse count at various input pressure and flow conditions to predict actual flow rate.

Figure 2:
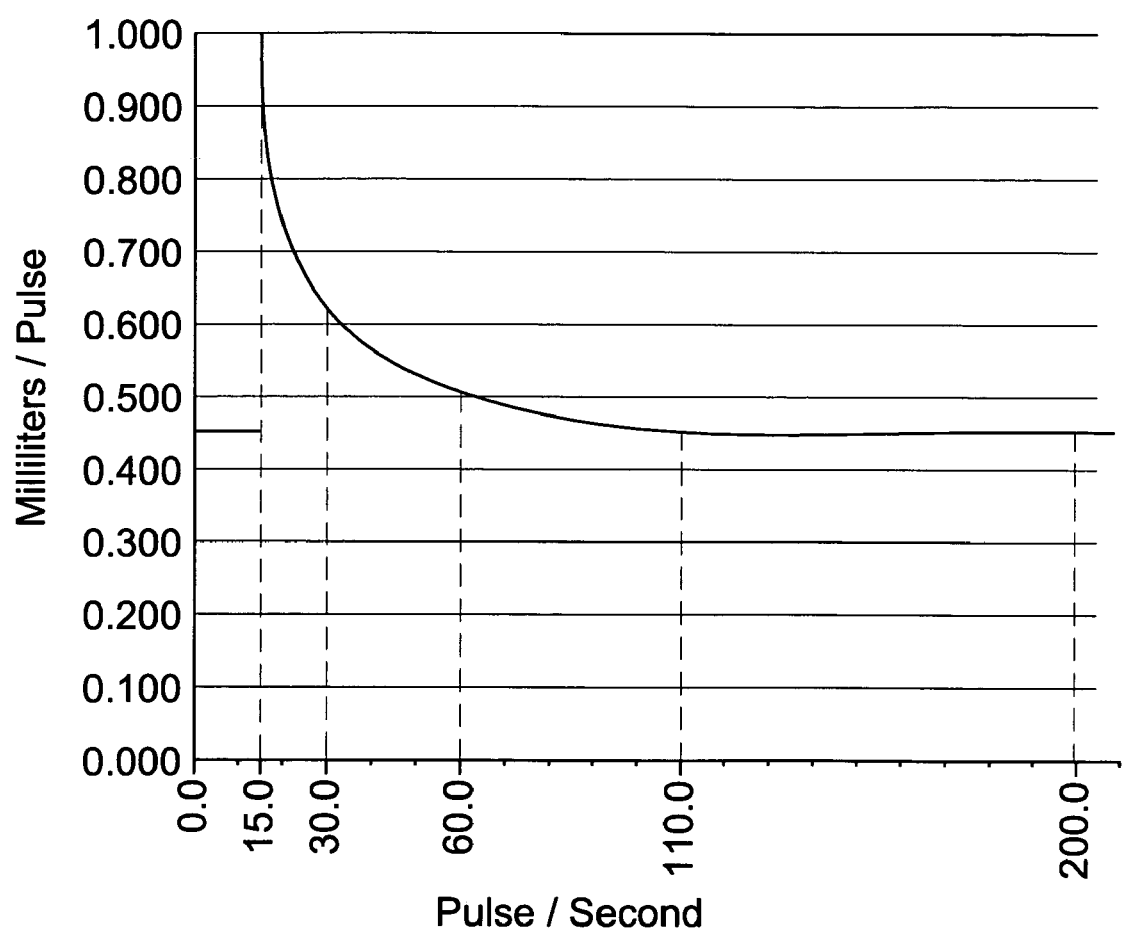
FIG. 2 is a simplified flow characterizing curve for the flow control valve of one embodiment of the present invention illustrating the volume of dispensed media per pulse of the flow meter versus the number of pulses generated by the flow meter per second.

To simplify the operation of controller 110, one embodiment to the present invention divides the pulse/second chart of FIG. 2 into a number of segments. The end points of the segments are illustrated by the vertical dashed lines in FIG. 2. The end points are chosen to allow a linear approximation of the data between the points. Obviously, the more segments, the better the approximation, with the tradeoff of increased complexity. In a preferred embodiment, five segments are utilized. The linear approximations for each of these segments are then used to construct the milliliter/pulse versus pulse duration control curve illustrated in FIG. 3.

It is this control curve illustrated in FIG. 3 that the controller 110 utilizes to compensate for the non-linear output of flow meter 114. That is, the controller 110 utilizes this curve to predict the actual flow rate. Based on the actual flow rate, the controller 110 can control how long valve 108 is to be kept open to provide the targeted volume of liquid to be dispensed. Specifically, as the pulse data is received from the flow meter 114, the controller 110 monitors the pulse duration. This duration may be measured from the top, bottom, or zero cross of the square wave output of the flow meter. Using the control curve of FIG. 3, the milliliters per pulse are then determined. This allows a determination of the instantaneous flow through the valve, which flow can change due to input pressure variations. The instantaneous valve is then added to a running total of the volume dispensed during this dispense window. This running total is then compared to the predetermined target of the volume of liquid to be dispensed. When this target is reached, the demand for flow is stopped, i.e., the valve 108 is closed.

FIG. 3 illustrates a control curve allowing simplified operation by controller 110 by using five linear segments 300-308. Other embodiments of the present invention for use in applications that require more precise control may achieve such increased precision by dividing the initial pulse per second versus milliliter per pulse graph into more divisions or segments. This will allow the linear approximations for each of the segments to better match the actual data of the curve. Indeed, one embodiment of the present invention does not utilize linear approximations of these segments, but instead calculates the control curve itself based on the actual data illustrated in FIG. 2.

Other embodiments of the present invention may utilize a lookup table equating the pulse duration to the milliliter per pulse through the valve 108. The data for such a table is extracted from the data plotted in FIG. 2. In such an embodiment a trade off will exist between the size of the lookup table and the speed and accuracy of determining the milliliter per pulse value. For measured pulse durations that lie between entries in the lookup table, the controller 110 will interpolate between the two nearest values to determine the milliliter per pulse value.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of controlling a volume of process media dispensed; comprising the steps of:
   receiving data from a flow-measuring device indicative of a measured flow rate;
   compensating for non-linearities of the flow-measuring device to determine an actual flow rate of the process media;
   calculating a total volume of process media dispensed based on the actual flow rate; and
   terminating a flow of process media when the total volume of process media equals a predetermined target volume;
   wherein the step of receiving data comprises the step of receiving pulse data from the flow-measuring device, and wherein the step of compensating comprises the steps of measuring a duration of each pulse of the pulse data, and determining an instantaneous flow rate based on the duration.

2. The method of claim 1, wherein the step of determining an instantaneous flow rate comprises the step of utilizing a compensation control curve that relates volume per pulse to pulse duration of the pulse data.

3. The method of claim 1, wherein the step of determining an instantaneous flow rate comprises the step of utilizing a piecewise linear compensation control curve that relates volume per pulse to pulse duration of the pulse data.

4. The method of claim 1, wherein the step of determining an instantaneous flow rate comprises the step of utilizing a look-up table that relates volume per pulse to pulse duration of the pulse data.

5. The method of claim 1, wherein the step of determining an instantaneous flow rate comprises the step of calculating a volume per pulse based on a control algorithm relating pulse duration of the pulse data to volume per pulse.

6. The method of claim 1, further comprising the steps of:
   testing the flow-measuring device to determine actual flow rate versus measured flow rate;
   segmenting the actual flow rate versus measured flow rate data into a plurality of segments;
   determining linear approximations for each of the plurality of segments; and
   generating a compensation control curve using the linear approximations to relate the actual flow rate to measured flow rate.

7. The method of claim 6, wherein the step of receiving data comprises the step of receiving pulse data from the flow-measuring device; and the step of testing the flow-measuring device to determine actual flow rate versus measured flow rate comprises the step of testing the flow-measuring device to determine actual flow rate versus rate of pulse data, and wherein the step of generating a compensation control curve using the linear approximations to relate the actual flow rate to measured flow rate comprises the step of generating a compensation control curve using the linear approximations to relate the actual flow rate to an inverse of the rate of pulse data.

8. A method of compensating measured flow rate data from a flow meter, comprising the steps of:
   testing the flow meter to determine actual flow rate versus rate of pulse data generated by the flow meter; and
   generating a compensation control curve to relate the actual flow rate to an inverse of the rate of pulse data;
   wherein the step of generating a compensation control curve to relate the actual flow rate to an inverse of the rate of pulse data comprises the steps of:
   segmenting the actual flow rate versus rate of pulse data into a plurality of segments;
   determining linear approximations for each of the plurality of segments; and
   generating the compensation control curve using the linear approximations to relate the actual flow rate to an inverse of the rate of pulse data.

9. The method of claim 8, further comprising the steps of:
   receiving pulse data from the flow meter;
   determining duration of each pulse of the pulse data; and
   utilizing the compensation control curve to determine the instantaneous flow rate based on the duration of each pulse.

10. The method of claim 9, further comprising the steps of:
    accumulating the instantaneous flow rate per unit time to determine a dispensed volume;
    comparing the dispensed volume to a predetermined target volume; and
    indicating when the dispensed volume equals the predetermined target volume.

11. A system of dispensing a predetermined volume of process media in a system having variable or varied input process media pressure, comprising:
    a valve having an input adapted to receive the process media and an output adapted to dispense the process media;
    a flow meter positioned in relation to the valve to measure a flow of the process media therethrough, the flow meter generating pulse data having a frequency non-linearly related to measured flow; and
    a controller having an input adapted to receive the pulse data from the flow meter and an output operatively coupled to the valve for controlling operation thereof; and
    wherein the controller utilizes a compensation control curve to determine an instantaneous volume being dispensed through the valve based on the inverse of the frequency of the pulse data, the controller accumulating instantaneous volume information and comparing to the predetermined volume, the controller further operating the valve to stop the flow of process media when the predetermined volume is reached.

12. The system of claim 11, wherein the compensation control curve relates volume per pulse to pulse duration of the pulse data.

13. The system of claim 11, wherein the compensation control curve is a piecewise linear approximation that relates volume per pulse to pulse duration of the pulse data.

14. The system of claim 11, wherein the compensation control curve is stored as a look-up table in the controller that relates volume per pulse to pulse duration of the pulse data.

15. The system of claim 11, wherein the controller calculates the instantaneous volume being dispensed based on a control algorithm relating pulse duration of the pulse data to volume per pulse that defines the compensation control curve.

16. The system of claim 11, further comprising an ice maker in fluid communication with the outlet of the valve to receive the dispensed volume of the process media.

* * * * *